United States Patent [19]

Reid et al.

[11] Patent Number: 4,555,541
[45] Date of Patent: Nov. 26, 1985

[54] BENZOATE-STABILIZED RIGID POLYVINYL CHLORIDE COMPOSITIONS

[75] Inventors: William J. Reid, New Fairfield, Conn.; Jean M. Zappia, Yonkers, N.Y.; Gerald A. Capocci, Greenwich, Conn.; John D. Spivack, Spring Valley, N.Y.

[73] Assignee: Ciba-Geigy Corporation, Ardsley, N.Y.

[21] Appl. No.: 579,232

[22] Filed: Feb. 13, 1984

[51] Int. Cl.[4] ............................................. C08K 5/58
[52] U.S. Cl. .................................... 524/180; 524/413
[58] Field of Search ............................... 524/180, 413

[56] References Cited

PUBLICATIONS

W. S. Castor et al., "Optical and Other Effects of White Pigments in Plastics" Additives for Plastics, vol. 1, 233–248, Raymond B. Seymour, editor, Academic Press, N.Y.

Hallas, Robert S., "Additives for Plastics-UV Stabilizers" Plastics Engineering, May 1976, 15-19.

Kuist, C. H., et al., "Accelerated U.V. Degradation of Rigid PVC" SPE Journal, Jul. 1976, vol. 24, 46-51.

Komar et al., Chemical Abstracts 70 (1969) 79203v.

Primary Examiner—Veronica P. Hoke
Attorney, Agent, or Firm—Harry Falber

[57] ABSTRACT

Rigid polyvinyl chloride containing reduced amounts of titanium dioxide and a tin mercaptide thermal stabilizer, said polyvinyl chloride being stabilized against the adverse effects of ultraviolet radiation by the addition thereto of effective amounts of mono- and dibenzoate compounds.

29 Claims, No Drawings

BENZOATE-STABILIZED RIGID POLYVINYL CHLORIDE COMPOSITIONS

Rigid polyvinyl chloride is utilized for a variety of applications including, for example, siding for houses and window frames. The rigid polyvinyl chloride is generally formulated with high levels of titanium dioxide, e.g. 12–15 parts per hundred, in order to provide proper pigmentation and prevent significant color variation upon exposure to UV radiation and with a tin mercaptide compound as a heat and process stabilizer. The combination of the titanium dioxide and the tin mercaptide permit the resin to be utilized outdoors, an essential characteristic, without undergoing excessive photodegradation. Manufacturers are thus generally assured that the siding, window frames, and the like, will be functional for substantial periods of time without significant color change or resin degradation.

There are, however, certain disadvantages to the use of such high levels of titanium dioxide. Of primary importance, the high content causes excessive wear and early failure, i.e. scoring and uneven wear of extruder barrels and screws in the polyvinyl chloride processing equipment, necessitating expensive and frequent replacement of parts. A further major shortcoming of rigid polyvinyl chloride containing these high titanium dioxide levels is that sidings prepared therefrom can only be in white or pastel colors. Darker shades of siding are not available because of the high levels. Attempts to lower the titanium dioxide level have resulted in significant reductions in light stability of the polyvinyl chloride as evidenced by unacceptable color changes, loss of impact strength and surface crazing.

It is, thus, the primary objective of this invention to provide rigid polyvinyl chloride with reduced titanium dioxide levels thereby substantially eliminating the disadvantages resulting from the use of high levels.

It is a further object to provide such material without sacrificing the beneficial properties thereof, such as effective light stability and high impact strength.

It is another object to provide such materials which exhibit a broader range of performance characteristics than the prior art materials.

Various other objectives of this invention will become apparent from a reading of the following description thereof.

It has now been determined that the titanium dioxide level of rigid polyvinyl chloride formulations can be significantly reduced while stirring maintaining the performance characteristics thereof. Thus, by incorporating certain selected benzoate compounds into the rigid polyvinyl chloride formulation, titanium dioxide levels can be significantly reduced to from about 2–8 parts per hundred. The resulting formulated polyvinyl chloride exhibits excellent light and heat stability, color retention and high impact strength. In addition, the lower titanium dioxide levels reduce the wear and resulting failure of the processing equipment while giving the siding and frame manufacturers greater flexibility in the color of the manufactured item, i.e. availability of darker colors.

The mono- and di-benzoates applicable for use in the instant invention correspond to the formulae

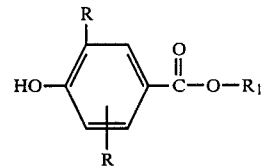
(I)

wherein

R is alkyl, and $R_1$ is alkyl, haloalkyl, phenyl, alkyl-substituted phenyl, alkyl-substituted benzoyloxy, or

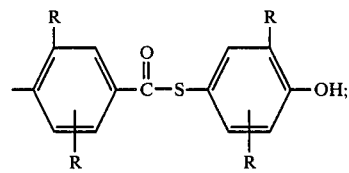

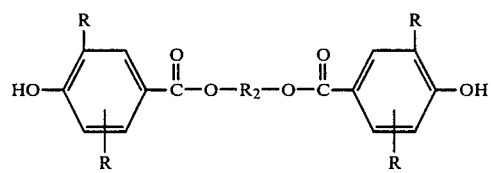
(II)

wherein

R is as defined hereinabove, $R_2$ is alkylene, haloalkylene or

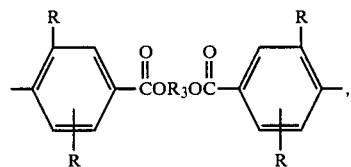

and $R_3$ is alkylene or haloalkylene;

(III)

wherein $R_4$ is

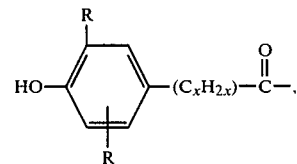

a is an integer from 2 to 6, b is an integer from 3 to 40, x is an integer from 0 to 6, d is 0 or 1, R is as defined hereinabove, and $R_5$ is

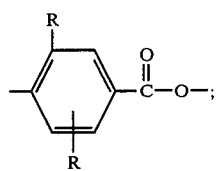

(IV)

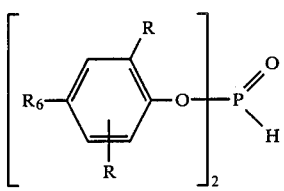

wherein
R is as previously defined,
$R_6$ is —$COOR_7$, and
$R_7$ is alkyl, phenyl or alkyl-substituted phenyl;

(V)

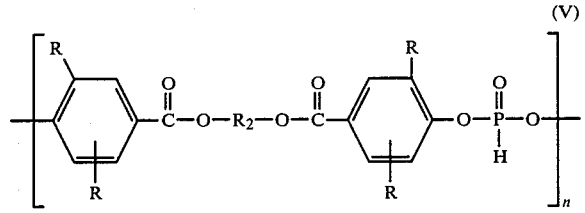

wherein
R and $R_2$ are as previously defined, and
n is 1–15;

(VI)

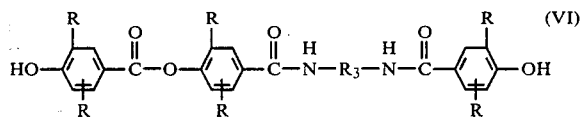

wherein R and $R_3$ are as previously defined; and

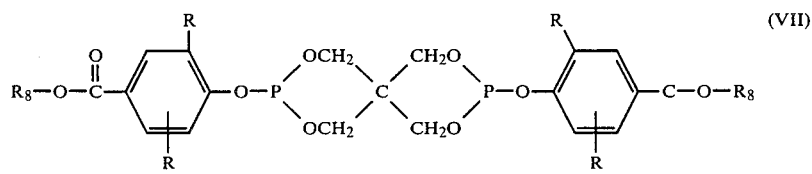

(VII)

wherein
R is as previously defined, and
$R_8$ is alkyl, phenyl or alkyl-substituted phenyl.

R is preferably alkyl of 1 to 8 carbon atoms. Particularly preferable is when both R groups on the ring are $C_4$–$C_8$ branched alkyl such as when R is tert.butyl, tert.amyl or tert.octyl and when both R groups are in the ortho position to the hydroxyl or in the meta-position to the carbonyl group.

$R_1$ is preferably alkyl of 1 to 24 carbon atoms, $C_2$–$C_8$ alkyl-substituted benzyloxy or the indicated thiobenzoyl moiety.

$R_2$ and $R_3$ are preferably $C_2$–$C_8$ alkylene.

a is preferably 2, b is preferably 3 to 30, x is preferably 0 to 2 and d is preferably 0.

$R_7$ and $R_8$ are preferably alkyl of 1 to 24 carbon atoms and more preferably alkyl of 1 to 18 carbon atoms.

n is preferably 3–5.

The mono- and di-benzoates designated groups I and II, processes for their preparation and their light stabilization effectiveness primarily in polyolefins are noted in a number of patents, e.g. U.S. Pat. Nos. 3,112,338, 3,206,431, 3,681,431, 4,128,726 and 4,237,042. Typical compounds include the methyl, propyl, amyl, decyl, hexadecyl, octadecyl, chloromethyl and 2,4-di-t-butylphenyl esters of 3,5-di-t-butyl-4-hydroxybenzoate as well as the ethane, propane, pentane and hexane bis(3,5-di-t-butyl-4-hydroxybenzoate) compounds. Another compound of group II is the 1,6-hexanediol bis(4'-(3,5-di-t-butyl-4-hydroxybenzoyloxy)-(3',5'-di-t-butyl)benzoate.

The polyalkylene glycol esters designated group III, processes for their preparation and their antioxidant and light stabilization utilities in a number of substrates including vinyl halide polymers are noted in U.S. Pat. No. 3,944,594. Typical compounds include the triethylene glycol, tetraethylene glycol, tripropylene glycol, tetrapropylene glycol, higher polyethylene and polypropylene glycol bis(3,5-di-t-butyl-4-hydroxybenzoate) compounds as well as triethylene glycol bis[4-(3,5-di-t-butyl-4-hydroxybenzoyloxy)-3,5-di-t-butyl benzoate].

The phosphorus-containing benzoates designated groups IV and V, processes for their preparation and their antioxidant and light stabilization utilities in a number of substrates including vinyl halide polymers are noted in U.S. Pat. No. 4,094,855. Typical compounds include the propyl, hexyl and dodecyl 3,5-di-t-butyl-4-hydroxybenzoate diesterphosphonic acids.

The diamine benzoates designated group VI are prepared in a comparable manner to the dibenzoate compounds designated group II. A typical compound is N-3,5-di-t-butyl-4-(3'',5''-di-t-butyl-4''-hydroxybenzoyloxy)benzoyl-N'-(3',5'-di-t-butyl-4'-hydroxybenzoyl)hexanediamine.

The dicyclic phosphites designated group VII, processes for their preparation and their light stabilization utility in a number of substrates including vinyl halide polymers are noted in U.S. Pat. No. 4,180,498. A typical compound is bis(2,6-di-t-butyl-4-octadecyloxycarbonylphenyl)pentaerythritol diphosphite.

Combinations of these benzoates with either benzotriazoles, hindered phenols or mixtures thereof also provide effective stabilization in the presence of the low titanium dioxide levels. Typical benzotriazoles include 2-(2'-hydroxyphenyl)-benzotriazoles, for example, the 5'-methyl-, 3',5'-di-tert.butyl-, 5'-tert.butyl-, 5'-(1,1,3,3-tetramethylbutyl)-, 5-chloro-3',5'-di-tert.butyl-, 5-chloro-3'-tert.butyl-5'-methyl-, 3'-sec.butyl-5'-tert.butyl-, 4'-octyloxy-, 3',5'-di-tert.amyl-, 3',5'-bis-(alpha,alpha-dimethylbenzyl)-derivatives. Typical hindered phenols include alkylated monophenols, alkylidene bisphenols, esters of β-(3,5-di-tert-butyl-4-hydroxyphenyl)acetic and propionic acids, corresponding 3-methyl-5- di-tert.butyl compounds, the corresponding amides, and the like.

The benzoates are utilized in concentrations ranging from 0.2 to 4.0%, by weight of resin, and preferably 0.5 to 2.0%. A maximum of about 50% of the benzoate concentration can be replaced when utilizing these optional additives in combination therewith, with the benzotriazole being able to replace a maximum of about 50% and the hindred phenol being able to replace a maximum of 25% whether utilized individually or in combination.

The titanium dioxides that are conventionally utilized in rigid polyvinyl chloride formulations are known and commercially available. The preferred titanium dioxides are rutile grades. For purposes of this invention, 2.0–8.0% of titanium dioxide, per weight of resin is applicable with 4.0 to 6.0% being preferred. These concentrations provide the necessary photodegradative inhibition when combined with the benzoates while substantially eliminating the aforementioned disadvantages of high titanium dioxide levels.

The instant invention relates to the stabilization of rigid polyvinyl chloride, i.e. unplasticized polyvinyl chloride resin as well as materials containing at least about 85% of polyvinyl chloride resin. Such resins generally contain additives including processing aids, impact modifiers, lubricants, pigments, fillers, and the like. They also contain thermal stabilizers. For purposes of this invention such thermal stabilizers are organotin mercaptides which are commercially available and well known to those skilled in the art. Such mercaptides correspond to the general formula $(R'S)_y Sn(R'')_{4-y}$ wherein $R'$ and $R''$ are individually selected from alkyl, cycloalkyl, aryl, alkaryl or aralkyl radicals among others and $y$ is 1–3. A wide variety of tin mercaptides are disclosed in U.S. Pat. Nos. 2,641,588, 2,726,227, 3,933,741 and 3,953,385. The disclosures in these patents relative to the tin mercaptides are deemed to be fully encompassed herein. Such stabilizers are generally present in concentrations ranging from 1.0 to 4.0%, by weight of resin. It is to be noted that the thermal stabilization effectiveness of these mercaptides is not sacrificed by the presence of the benzoate and the reduction in the titanium dioxide level. Techniques for processing rigid polyvinyl chloride are also known to those skilled in the art and such techniques are applicable herein. Compounding followed by extrusion is the conventional technique for siding manufacture.

As previously noted, the stabilized rigid polyvinyl chlorides of this invention exhibit a broad range of desirable properties. Of particular value, they permit the reduction of titanium dioxide levels without sacrificing the light stability and impact strength provided by the high levels. In addition, the lowering of the titanium dioxide content allows for significantly reduced wear on the processing machinery and for an expansion of the number of pigmented systems that can be readily utilized therein. Thus, while the high titanium dioxide levels restrict the available colors to white and pastels, the instant systems are available in a broad range of light, pastel and dark colors.

The following examples illustrate the preferred embodiments of the invention. In these examples, all parts given are by weight unless otherwise specified.

EXAMPLE I

The following rigid polyvinyl chloride formulations were utilized in the examples.

| | parts | | |
|---|---|---|---|
| | I | II | III |
| polyvinyl chloride resin[1] | 100 | 100 | — |
| polyvinyl chloride resin[2] | — | — | 100 |
| methacrylic acid/ester processing aid[3] | 2.0 | 1.5 | 1.5 |
| acrylic impact modifier[4] | 7.0 | 5.0 | 5.0 |
| calcium stearate | 0.8 | 1.0 | 1.0 |
| paraffin wax | 1.0 | 1.0 | 1.0 |
| polyethylene wax | 0.2 | 1.0 | 1.0 |
| tin mercaptide[5] | 2.0 | 1.6 | 1.6 |
| titanium dioxide (rutile, non-chalking) | variable | variable | variable |
| light stabilizer | variable | variable | variable |

[1] GEON 103EP-76 from B.F. Goodrich Co.
[2] GEON 85862 from B.F. Goodrich Co.
[3] ACRYLOID K120N from Rohm & Haas
[4] ACRYLOID K330 from Rohm & Haas
[5] THERMOLITE T137 from M & T Chemicals The ingredients are blended including the indicated amounts of $TiO_2$ and stabilizer. The samples are milled on a two roll mill (front roll @ 171° C.—back roll @ 165° C.) for a period of three minutes after band formation. The resulting material is then compression molded (temperature 182° C., 2 minutes no pressure, 1 minute pumping pressure, 2 minutes full pressure, cool to 38° C.) into test plaques (5.1 cm.×5.1 cm.)

The following compounds were utilized in these examples.

Benzoate Compounds

A—1,6-hexanediol-bis(3,5-di-t-butyl-4-hydroxybenzoate)
B—1,6-hexanediol-bis(4'-(3,5-di-t-butyl-4-hydroxybenzoyloxy)-3',5'-di-t-butylbenzoate)
C—phosphonic acid, n-dodecyl-3,5-di-t-butyl-4-hydroxybenzoate diester
D—phosphonic acid, n-hexyl-3,5-di-t-butyl-4-hydroxybenzoate diester
E—poly-[1,6-hexanediol-bis(3,5-di-t-butyl-4-hydroxybenzoate)]phosphonate
F—octadecyl-(3,5-di-t-butyl-4-hydroxybenzoyloxy)-3',5'-di-t-butyl-benzoate
G—S-(3',5'-di-t-butyl-4-hydroxyphenyl)-4-(3,5-di-t-butyl-4-hydroxybenzoyloxy)-3,5-di-t-butyl-4-hydroxybenzoate
H—methyl-3,5-di-t-butyl-4-hydroxybenzoate
I—octadecyl-3,5-di-t-butyl-4-hydroxybenzoate
J—hexadecyl-3,5-di-t-butyl-4-hydroxybenzoate
K—(2,4-di-t-butylphenyl)-3,5-di-t-butyl-4-hydroxybenzoate
L—triethyleneglycol-bis(3,5-di-t-butyl-4-hydroxybenzoate)
M—triethyleneglycol-bis[4-(3,5-di-t-butyl-4-hydroxybenzoyloxy)-3,5-di-t-butyl benzoate]
N—N-3,5-di-t-butyl-4-(3',5'-di-t-butyl-4'-hydroxybenzoyloxy)benzoyl-N'-(3',5'-di-t-butyl-4'-hydroxybenzoyl)hexanediamine
O—bis(2,6-di-t-butyl-4-octadecyloxycarbonylphenyl)-pentaerythritol diphosphite

Non-benzoate additives

P—2(2'-hydroxy-3',5'-di-tert-amylphenyl)benzotriazole
Q—2(2'-hydroxy-5'-methylphenyl)benzotriazole
R—octadecyl-3-(3',5'-di-t-butyl-4'-hydroxyphenyl)propionate The formulated samples were submitted to the following test procedures:

Test I—Dry Xenon Weatherometer Exposure

Exposed in Xenon Weatherometer at black panel temperature of 55°-60° C. and relative humidity of 70-75%. Samples are withdrawn at periodic intervals and yellowness index measured according to ASTM D-1925-63T. Higher values are indicative of lower stability. "Failure" reflects a yellowness index greater than 40.

Test II—Spray Xenon Weatherometer Exposure

Exposed as in Test I with identical black panel temperature and relative humidity, 102 minutes of dry cycle and 18 minutes of water spray cycle. Measured by yellowness index.

Test III—Arizona Exposure

Exposed outdoors in Arizona at 92,000 langleys. Yellowness index measured initially and after six months exposure. Impact resistance measured at comparable intervals by use of a Dynatup Model 800 Instrumented Drop Weight Impact System from Tinuius Olson.

Test IV—EMMAQUA Exposure

Exposed in equatorial mount with mirrors for acceleration plus water spray (ASTM 838E). Yellowness index measured after exposure to varying amounts of kilolangleys.

The results obtained in these tests are noted in the following tables:

TABLE I

| | Formulation II-Test I | | | | | |
|---|---|---|---|---|---|---|
| | Conc. | Conc. | | Yellowness Index | | |
| Stabilizer | Stab. (phr) | TiO$_2$ (phr) | 0 hrs | 1505 hrs | 2710 hrs | 3390 hrs |
| — | — | 12 | 5 | 6 | 19 | 25 |
| — | — | 5 | 6 | 8 | 26 | failed |
| A | 2 | 5 | 6 | 6 | 19 | 20 |
| A/P | 1/1 | 5 | 7 | 7 | 20 | 21 |
| C/P | 1/1 | 5 | 7 | 6 | 16 | 17 |
| | | | 0 hrs | 1070 hrs | 1985 hrs | 3235 hrs |
| — | — | 12 | 5 | 6 | 9 | 13 |
| — | — | 5 | 5 | 8 | 17 | 21 |
| C | 1 | 5 | 5 | 6 | 9 | 16 |
| C | 2 | 5 | 5 | 5 | 6 | 14 |
| D | 1 | 5 | 5 | 5 | 8 | 15 |
| E | 1 | 5 | 5 | 6 | 10 | 16 |
| A | 1 | 5 | 6 | 6 | 9 | 15 |
| | | | 0 hrs | 1090 hrs | 2173 hrs | 3043 hrs |
| — | — | 12 | 5 | 6 | 8 | 13 |
| — | — | 5 | 5 | 8 | 17 | 21 |
| C/Q | 1/1 | 5 | 5 | 7 | 9 | 13 |
| C/R | 1/1 | 5 | 5 | 8 | 12 | 13 |
| C/Q/R | 1/0.5/0.5 | 5 | 5 | 9 | 13 | 16 |
| | | | 0 hrs | 1600 hrs | | |
| — | — | 12 | 4 | 8 | | |
| — | — | 5 | 6 | 13 | | |
| O | 1 | 5 | 5 | 8 | | |
| O | 2 | 5 | 5 | 7 | | |

TABLE II

| | Formulation II-Test II | | | | |
|---|---|---|---|---|---|
| | Conc. | Conc. | Yellowness Index | | |
| Stabilizer | Stab. (phr) | TiO$_2$ (phr) | 0 hrs | 3800 hrs | 5850 hrs |
| Series A | | | | | |
| — | — | 12 | 5 | 6 | 7 |
| — | — | 5 | 5 | 8 | 15 |
| C | 1 | 5 | 5 | 6 | 12 |
| C | 2 | 5 | 5 | 6 | 10 |
| D | 1 | 5 | 5 | 6 | 10 |
| E | 1 | 5 | 5 | 7 | 12 |
| A | 1 | 5 | 6 | 7 | 11 |
| F | 1 | 5 | 6 | 8 | 15 |
| G | 1 | 5 | 6 | 13 | 16 |
| Series B | | | | | |
| — | — | 12 | 6 | 7 | 9 |
| — | — | 5 | 6 | 11 | 16 |
| H | 1 | 5 | 6 | 9 | 16 |
| I | 1 | 5 | 6 | 8 | 13 |
| I | 2 | 5 | 5 | 8 | 12 |
| J | 1 | 5 | 6 | 8 | 12 |
| J | 2 | 5 | 6 | 9 | 13 |
| K | 1 | 5 | 6 | 11 | 18 |
| A | 1 | 5 | 6 | 8 | 13 |
| A | 2 | 5 | 6 | 8 | 13 |
| B | 1 | 5 | 6 | 10 | 14 |
| L | 1 | 5 | 6 | 10 | 13 |
| M | 1 | 5 | 6 | 11 | 14 |
| N | 1 | 5 | 7 | 10 | 13 |
| C | 1 | 5 | 6 | 8 | 13 |
| C | 2 | 5 | 6 | 7 | 10 |

The following series illustrates the necessary presence of small amounts of titanium dioxide and the ability of the instant stabilizers to provide performance compensation for the larger amounts of titanium dioxide previously thought to be necessary in such rigid polyvinyl chloride systems.

TABLE III

| | Formulation II-Test II | | | | |
|---|---|---|---|---|---|
| | Conc. | Conc. | Yellowness Index | | |
| Stabilizer | Stab. (phr) | TiO$_2$ (phr) | 0 hrs | 3800 hrs | 5850 hrs |
| — | — | 0 | 9 | failed | failed |
| — | — | 3 | 5 | 18 | 27 |
| — | — | 5 | 6 | 10 | 17 |
| — | — | 8 | 5 | 7 | 11 |
| — | — | 12 | 5 | 7 | 9 |
| A | 2 | 0 | 12 | failed | failed |
| A | 1.5 | 3 | 5 | 16 | 25 |
| A | 0.5 | 5 | 6 | 10 | 14 |
| A | 1 | 5 | 5 | 10 | 14 |
| A | 1.5 | 5 | 6 | 10 | 15 |
| A | 2 | 5 | 5 | 9 | 15 |
| A | 0.5 | 8 | 6 | 7 | 10 |
| C | 2 | 0 | 12 | failed | failed |
| C | 1.5 | 3 | 6 | 11 | 19 |
| C | 1 | 3 | 6 | 12 | 17 |
| C | 0.5 | 5 | 5 | 8 | 13 |
| C | 1 | 5 | 6 | 8 | 13 |
| C | 1.5 | 5 | 5 | 8 | 11 |
| C | 2 | 5 | 5 | 8 | 10 |
| C | 0.5 | 8 | 5 | 7 | 8 |

TABLE IV

| | Formulation I-Test III | | | | | |
|---|---|---|---|---|---|---|
| | Conc. | Conc. | Yellowness Index | | Impact* | |
| Stabilizer | Stab. (phr) | TiO$_2$ (phr) | Initial | 6 months | Initial | 6 months |
| — | — | 12 | 6 | 15 | 9.6 | 9.0 |
| — | — | 5 | 8 | 22 | 6.0 | 0.6 |
| A | 1 | 5 | 6 | 11 | 7.8 | 8.4 |
| C | 1 | 5 | 5 | 9 | 9.3 | 9.3 |

*meter-kilograms

TABLE V

| | | Formulation I-Test IV | | | |
|---|---|---|---|---|---|
| Stabilizer | Conc. Stab. (phr) | Conc. TiO$_2$ (phr) | \multicolumn{3}{c}{Yellowness Index} |
| | | | Initial | 250 Klys* | 400 Klys |
| — | — | 12 | 6 | 12 | 24 |
| — | — | 5 | 6 | 19 | 34 |
| A | 1 | 5 | 6 | 11 | 26 |
| C | 1 | 5 | 5 | 8 | 24 |

*kilolangleys

TABLE VI*

| | Formulation III-Test** | | |
|---|---|---|---|
| Stabilizer | Conc. Stab. (phr) | Conc. TiO$_2$ (phr) | Yellowness Index (initial color) |
| — | — | 5 | 6.7 |
| A | 1 | 5 | 5.8 |
| C | 1 | 5 | 4.5 |

*Subsequent to milling, samples were subjected to extrusion under following conditions.
Cylinder 1 - 193° C.
Cylinder 2 - 196° C.
Cylinder 3 - 196° C.
Die 1 - 196° C.
Die 1 - 196° C.
Die 1 - 196° C.
Screw Speed = 80 rpm
**Yellowness index measurement on milled and extruded samples - No additional exposure The following tests were directed to color pigmented systems.

TABLE VII

Formulation I-Test II

Yellow System
2 phr TiO$_2$
2 phr Buff Yellow 10404 (Drakenfeld Colors) } added to formulation at TiO$_2$ addition point

| | Conc. | ΔE-Total Color Change* | |
|---|---|---|---|
| Stabilizer | Stab. (phr) | Initial | 4000 hrs. |
| — | — | 0 | 26 |
| C | 1 | 0 | 15 |
| C | 2 | 0 | 12 |

Barn Red System
4 phr CROMOPHTAL 3927A (Ciba-Geigy Corp.)
2 phr Buff Yellow 10404 (Drakenfeld Colors)
0.05 phr IRGAZIN Blue 3GT (Ciba-Geigy Corp.)
2 phr TiO$_2$
} added to formulation at TiO$_2$ addition point

| | Conc. | ΔE-Total Color Change* | |
|---|---|---|---|
| Stabilizer | Stab. (phr) | Initial | 4000 hrs. |
| — | — | 0 | 12 |
| A | 1 | 0 | 6 |
| A | 2 | 0 | 7 |
| C | 1 | 0 | 10 |
| C | 2 | 0 | 9 |

*Measurement of color change identifying unexposed pigmented system as "0" (ASTM D 2244-79 § 4.2.3)

These data clearly indicate that the rigid polyvinyl chloride formulations of this invention perform to the level and frequently surpass the level of light stabilization of formulations containing the undesirable high levels of titanium oxide. Thus, the indicated benzoates clearly compensate for the eliminated quantities of titanium dioxide while allowing for more efficient processing and a larger variety of pigmented systems.

In summary, this invention provides rigid polyvinyl chloride compositions which exhibit a broad range of excellent performance characteristics. Variations may be made in procedures, proportions and materials without departing from the scope of the invention as defined by the following claims.

What is claimed is:

1. A rigid polyvinyl chloride composition comprising in addition to said polyvinyl chloride, 2 to 8% titanium dioxide, by weight of the polyvinyl chloride, an effective thermal stabilizing amount of a tin mercaptide and an effective stabilizing amount of a benzoate compound of the formulae $$HO-\text{C}_6H_2(R)_2-\overset{O}{\underset{\|}{C}}-O-R_1 \quad (I)$$

wherein
R is alkyl and
R$_1$ is alkyl, haloalkyl, phenyl, alkyl-substituted phenyl, alkyl-substituted benzoyloxy;

$$HO-\text{C}_6H_2(R)_2-\overset{O}{\underset{\|}{C}}-O-R_2-O-\overset{O}{\underset{\|}{C}}-\text{C}_6H_2(R)_2-OH \quad (II)$$

wherein
R is as defined hereinabove,
R$_2$ is alkylene, haloalkylene or $$-\text{C}_6H_2(R)_2-\overset{O}{\underset{\|}{C}}-O-R_3-O-\overset{O}{\underset{\|}{C}}-\text{C}_6H_2(R)_2-,$$

and R$_3$ is alkylene or haloalkylene;

$$R_4-O-(R_5)_{\overline{d}}-(C_aH_{2a}O)_{\overline{b}}-(R_5)_{\overline{d}}-R_4 \quad (III)$$

wherein
R$_4$ is $$HO-\text{C}_6H_2(R)_2-(C_xH_{2x})-\overset{O}{\underset{\|}{C}}-,$$

a is an integer from 2 to 6,
b is an integer from 3 to 40,
x is an integer from 0 to 6,
d is 0 or 1,
R is as defined hereinabove, and
R$_5$ is

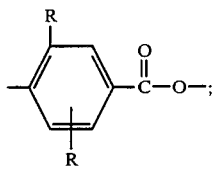

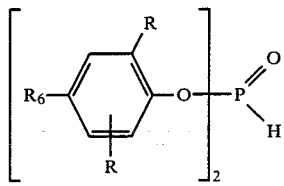

wherein
R is as previously defined,
$R_6$ is —$COOR_7$, and
$R_7$ is alkyl, phenyl or alkyl-substituted phenyl;

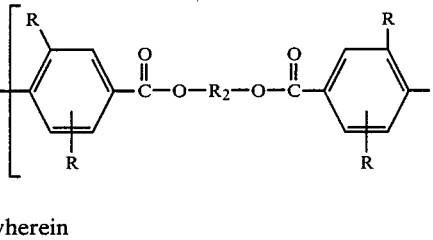

wherein
R and $R_2$ are as previously defined, and
n is 1–15;

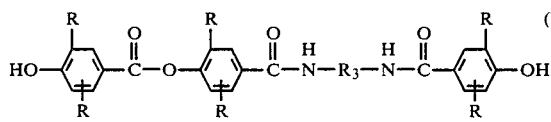

wherein R and $R_3$ are as previously defined; and

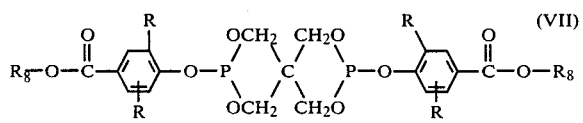

wherein
R is as previously defined, and
$R_8$ is alkyl, phenyl or alkyl-substituted phenyl.

2. The composition of claim 1, wherein said benzoate corresponds to formula I.

3. The composition of claim 2, wherein both R groups are tertiary butyl and are in the ortho position to the hydroxyl group.

4. The composition of claim 2, wherein $R_1$ is alkyl of 1 to 24 carbon atoms.

5. The composition of claim 1, wherein said benzoate corresponds to formula II.

6. The composition of claim 5, wherein all the R groups are tertiary butyl and are positioned ortho to the hydroxyl group or meta to the carbonyl group.

7. The composition of claim 5, wherein $R_2$ and $R_3$ are $C_2$–$C_8$ alkylene.

8. The composition of claim 7, wherein said benzoate is 1,6-hexanediol-bis(3,5-di-t-butyl-4-hydroxybenzoate).

9. The composition of claim 1, wherein said benzoate corresponds to formula III.

10. The composition of claim 9, wherein all the R groups are tertiary butyl and are positioned ortho to the hydroxyl group or meta to the carbonyl group.

11. The composition of claim 9, wherein a is 2 and b is 3.

12. The composition of claim 11, wherein said benzoate is triethyleneglycol-bis(3,5-di-t-butyl-4-hydroxybenzoate) or triethyleneglycol-bis[4-(3,5-di-t-butyl-4-hydroxybenzoyloxy)-3,5-di-t-butyl benzoate].

13. The composition of claim 1, wherein said benzoate corresponds to formula IV.

14. The composition of claim 13, wherein the R groups are tertiary butyl and are positioned ortho to the oxygen atom.

15. The composition of claim 13, wherein $R_7$ is alkyl of 1 to 24 carbon atoms.

16. The composition of claim 15, wherein said benzoate is phosphonic acid, n-dodecyl-3,5-di-tert-butyl-4-hydroxybenzoate diester or phosphonic acid, n-hexyl-3,5-di-tert-butyl-4-hydroxybenzoate diester.

17. The composition of claim 1, wherein said benzoate corresponds to formula V.

18. The composition of claim 17, wherein all R groups are tertiary butyl and are positioned meta to the carbonyl and $R_2$ is $C_2$–$C_8$ alkylene.

19. The composition of claim 18, wherein said benzoate is poly[1,6-hexanediol-bis-(3,5-di-t-butyl-4-hydroxybenzoate)]phosphonate.

20. The composition of claim 1, wherein said benzoate corresponds to formula VI.

21. The composition of claim 20, wherein all R groups are tertiary butyl and are positioned meta to the carbonyl and $R_3$ is $C_2$–$C_8$ alkylene.

22. The composition of claim 21, wherein said benzoate is N-3,5-di-t-butyl-4-(3″,5″-di-t-butyl-4″-hydroxybenzoyloxy)benzoyl-N′-(3′,5′-di-t-butyl-4′-hydroxybenzoyl)hexanediamine.

23. The composition of claim 1, wherein said benzoate corresponds to formula VII.

24. The composition of claim 23, wherein all R groups are meta to the carbonyl group and $R_8$ is alkyl of 1 to 24 carbon atoms.

25. The composition of claim 24, wherein said benzoate is bis(2,6-di-t-butyl-4-octadecyloxycarbonylphenyl)-pentaerythritol diphosphite.

26. The composition of claim 1 which contains 0.2 to 4.0% of benzoate, by weight of polyvinyl chloride.

27. The composition of claim 1 which additionally contains a benzotriazole, a hindered phenol or mixtures thereof; said benzotriazole replacing a maximum of 50% of said benzoate and said phenol replacing a maximum of 25% of said phenol with the total replacement by both additives not exceeding 50% of said benzoate.

28. The composition of claim 27, wherein said benzoate corresponds to formula II.

29. The composition of claim 27, wherein said benzoate corresponds to formula IV.

* * * * *